United States Patent [19]
Yasuda et al.

[11] Patent Number: 5,949,792
[45] Date of Patent: Sep. 7, 1999

[54] METHOD AND APPARATUS FOR ENCODING A DIGITAL SIGNAL, RECORDING MEDIUM USED FOR STORING THE DIGITAL SIGNAL, AND METHOD AND APPARATUS FOR TRANSMITTING THE DIGITAL SIGNAL

[75] Inventors: Mikita Yasuda, Tokyo; Katsumi Tahara, Kanagawa; Noriaki Oishi, Kanagawa; Shinji Negishi, Kanagawa, all of Japan

[73] Assignee: Sony Corporation, Tokyo, Japan

[21] Appl. No.: 08/841,681

[22] Filed: Apr. 30, 1997

[30] Foreign Application Priority Data

May 2, 1996 [JP] Japan ............................. 8-111682

[51] Int. Cl.⁶ .................................................. H04J 3/24
[52] U.S. Cl. ........................ 370/474; 370/471; 370/473
[58] Field of Search ................................ 370/474, 471, 370/473, 477, 505, 506, 468, 466

[56] References Cited

U.S. PATENT DOCUMENTS

| 5,396,497 | 3/1995 | Veltman ............................... 348/423 |
| 5,612,956 | 3/1997 | Walker et al. ........................ 370/545 |
| 5,784,528 | 7/1998 | Yamane et al. ...................... 386/112 |

FOREIGN PATENT DOCUMENTS 0 692 911  1/1996  European Pat. Off. .

OTHER PUBLICATIONS

Weiss, S. M.: "Switching Facilities in MPEG–2: Necessary But Not Sufficient" SMPTE Journal, vol. 104, No. 12, Dec. 1, 1995, pp. 788–802, XP000543847.

Primary Examiner—Jeffery A. Hofsass
Assistant Examiner—Mitchell Slavitt
Attorney, Agent, or Firm—Frommer Lawrence & Haug, LLP.; William S. Frommer

[57] ABSTRACT

A method for encoding a digital signal which is free from overflow and/or underflow of decoder buffer when video and audio data are reproduced while switching a plurality of bit streams from one to another, is disclosed. The method includes the steps of receiving a plurality of digital signal bit streams, detecting sizes of access units, as an encoding unit, of the plural digital signal bit streams, and decode times thereof, comparing the detected sizes of the access units at each decode time, with each other to select a maximum value thereof, providing a virtual stream composed of access units each having a size identical to the selected maximum value at each decode time, and packetizing each of the plural digital signal bit streams, wherein the plural digital signal bit streams are packetized by using padding packets each having a size corresponding to a difference in size between each access unit of the plural digital signal bit streams and that of the virtual stream, when the size of the access unit of the plural digital signal bit streams is less than the size of the access unit of the virtual stream. In accordance with the present invention, there are also provided an apparatus for encoding the digital signal, a method for recording the digital signal on a recording medium, and a method for transmitting the digital signal.

8 Claims, 9 Drawing Sheets

FIG.1

FIG.2A STRUCTURE OF PROGRAM STREAM

FIG.2B STRUCTURE OF TRANSPORT STREAM

METHOD AND APPARATUS FOR ENCODING A DIGITAL SIGNAL, RECORDING MEDIUM USED FOR STORING THE DIGITAL SIGNAL, AND METHOD AND APPARATUS FOR TRANSMITTING THE DIGITAL SIGNAL

BACKGROUND OF THE INVENTION

1. Field of the Invention

The present invention relates to a method and apparatus for encoding a digital signal, a recording medium used for storing the digital signal and a method and apparatus for transmitting the digital signal, which are suitable for recording a dynamic image signal or a sound signal on a recording medium such as magneto-optical disk or magnetic tape and reproducing these signals from the recording medium so as to display a video image on a monitor, or for transmitting the dynamic image signal or the sound signal through a transmission line from a transmitting side to a receiving side where video image or sound is reproduced, in video conference system, video telephone system, broadcasting equipment or the like.

2. Description of the Related Art

In recent years, in many cases, when picture signal or speech signal stored on a recording medium such as magneto-optical disk or magnetic tape is reproduced therefrom to display a video image with sound, or transmitted through a given transmission line from a transmitting side to a receiving side where video image or sound is reproduced, as used in video conference system, video telephone system or the like, these signals have been encoded according to a so-called MPEG system after subjected to A/D conversion.

Here, the afore-mentioned "MPEG" represents an abbreviation of Moving Picture Experts Group which is an organization for investigating the encoding of dynamic image to be stored, belonging to ISO/IEC, JTC1/SC29 (International Organization for standardization/International Electrotechnical Commission, Joint Technical Committee 1/Sub-Committee 29). ISO11172 is prescribed as MPEG1 standard while ISO13818 is prescribed as MPEG2 standard. In these international standards, the term "multiplexing of multi-media" is normalized in ISO11172-1 and ISO13818-1 while the term "picture image" is normalized in ISO11172-3 and ISO13818-3.

Since the picture signal and the speech signal are usually handled at the same time, it is general that a plurality of data including the picture signal, the speech signal and related information data are multiplexed so as to be recorded and transmitted together. When these signals are reproduced, the multiplexed data is separated or demultiplexed into individual kinds of data and then decoded to reproduce these data in a synchronous manner.

In the case where these data are multiplexed, the given number of picture signals and speech signals are individually encoded to produce encoded streams, and thereafter these encoded streams are multiplexed.

The multiplexed stream is prescribed in MPEG system (ISO/IEC13818-1 or ISO/IEC11172-1). In the following, the structure of the decoder model and the multiplexed stream prescribed in the MPEG system are explained. For simplicity, the explanation is made in the context of MPEG2 (ISO/IEC13818-1) program stream and MPEG1 system (ISO/IEC11172-1) stream. However, it will be appreciated that the principle for decoding the MPEG 2 program stream is equally applicable to decoding of MPEG2 system transport stream (ISO/IEC11172-1).

In the MPEG system, a virtual decoder model (STD: system target decoder) is prescribed. The multiplexed stream is defined therein such that the stream can be correctly decoded by the system target decoder (STD), i.e., it can be decoded without causing inappropriate operative condition of buffer such as overflow or underflow of data.

Figure 1:
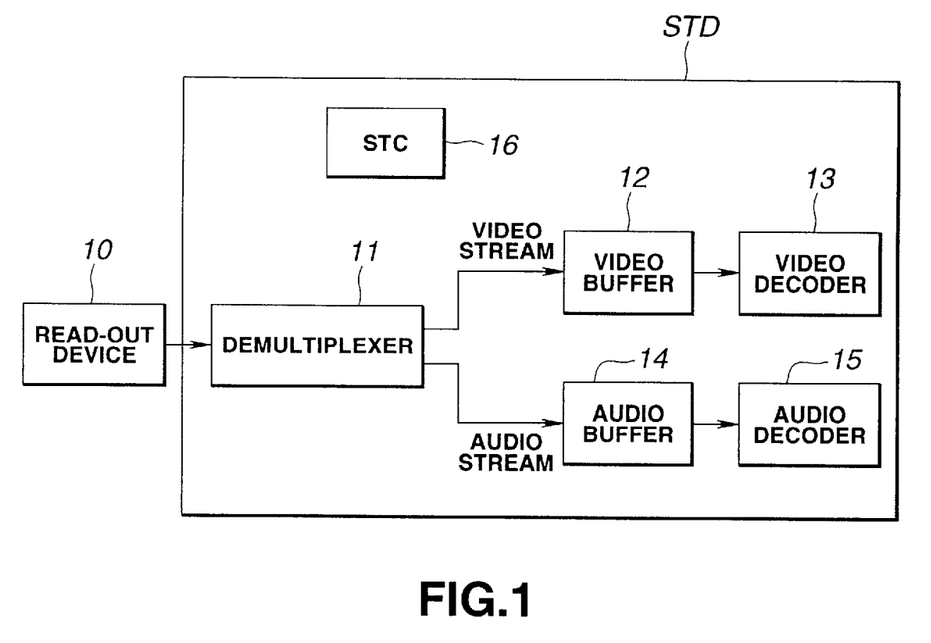
FIG. 1 is a block diagram schematically showing an arrangement of a system target decoder (STD) prescribed in a so-called MPEG standard.
Figure 2A:
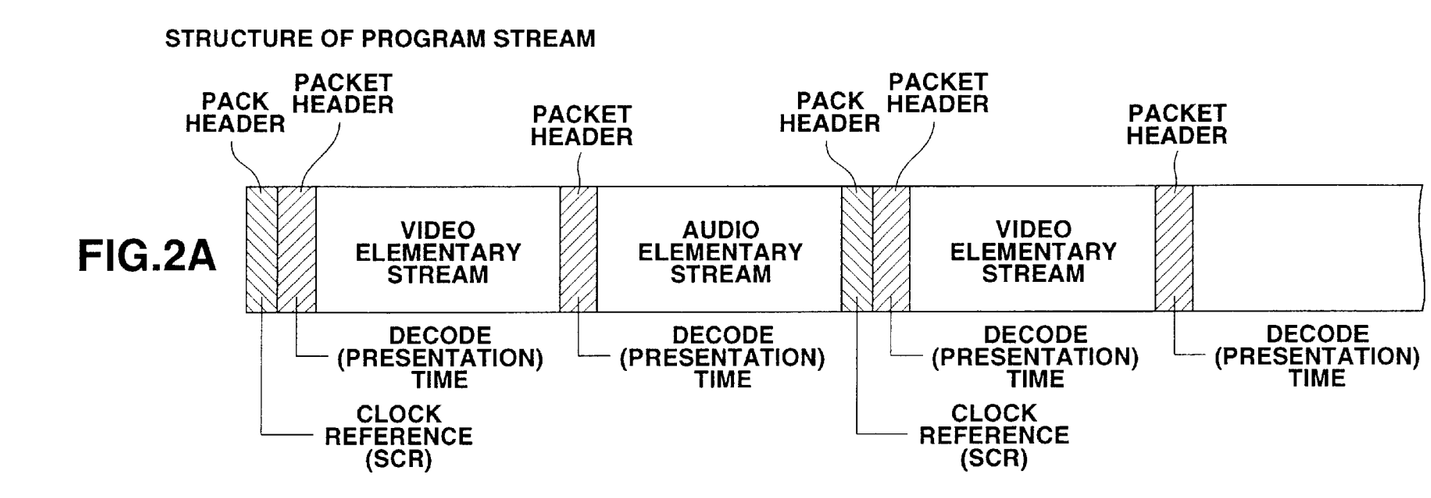
FIGS. 2A and 2B are views showing examples of arrangements of a program stream and a transport stream prescribed in a so-called MPEG standard, respectively.
Figure 2B:
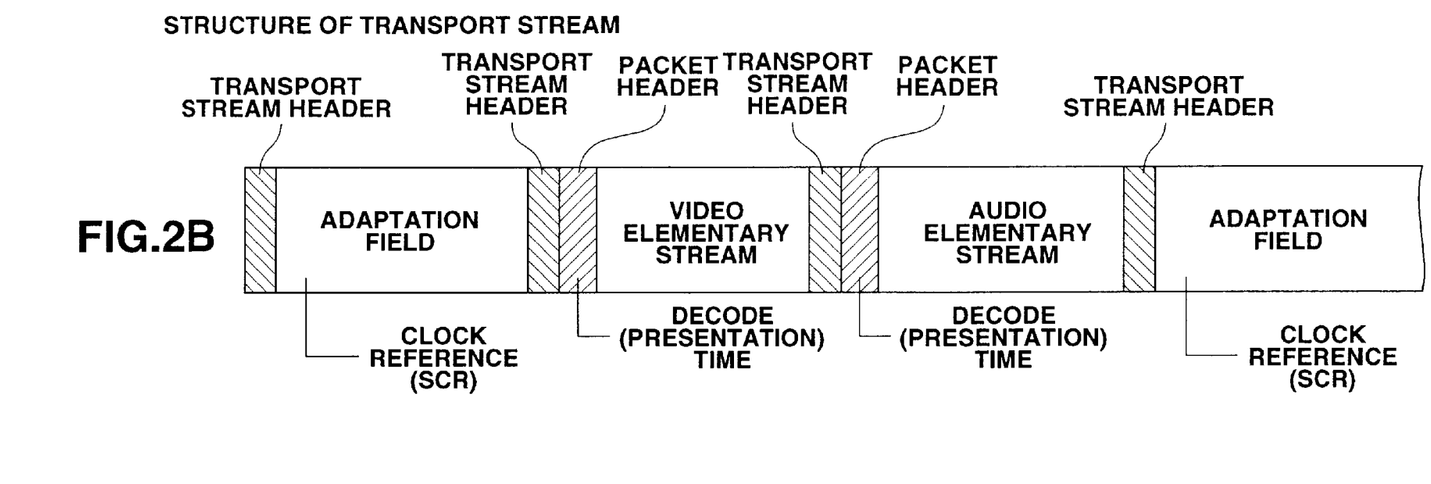

Next, the operation of the system target decoder (STD) is described. FIG. 1 illustrates a schematic arrangement of an example of the system target decoder STD. FIGS. 2A and 2B illustrate the structures of the MPEG2 program stream and MPEG2 transport stream, respectively.

The system target decoder STD 16 include therein a reference clock called a system time clock (STC) 16, which is put forward in a predetermined increment. On the other hand, MPEG2 system program stream is composed of a plurality of access units. The stream has a time information called a system clock reference (SCR) which is encoded in a region called a pack header, as shown in FIGS. 2A and 2B. When the time of STC 16 is equal to the SCR, the decoder read out a corresponding pack, i.e., a unit of the program stream at a predetermined rate, i.e., a rate which is encoded in "mux_rate field" of the pack header.

The read-out pack is immediately separated or demultiplexed into respective elementary streams such as video stream and audio stream by means of a demultiplexer 11 depending upon a sort of each packet which is a unit of the pack. The respective demultiplexed elementary streams are input to corresponding decoder buffers, i.e., a video buffer 12 and an audio buffer 14.

The packet header has fields for time information which is called a decoding time stamp (DTS) or a presentation time stamp (PTS), as shown in FIGS. 2A and 2B. The time information represents decode time and presentation time of a decoding unit (access unit) of each elementary stream. Specifically, the PTS represents a time at which the access unit is displayed, and the DTS represents a time at which the access unit is decoded. However, in the case of the access unit whose DTS and PTS are equal to each other, only the data of the PTS is encoded. When the value of the STC is equal to the value of the DTS, the access unit input into the video buffer 12 or the audio buffer 14 are read out therefrom and supplied to respective decoders, i.e., a video decoder 13 or an audio decoder 15 so as to be decoded.

Thus, in the system target decoder STD, since the decode time information relative to the common reference clock (STC) 16 is encoded in the packet of each elementary stream, video data, audio data or other data can be reproduced in a synchronous manner.

In addition, upon multiplexing, it is required that the system clock reference SCR which defines a supply time of the pack to the system target decoder STD should be determined so as not to cause overflow or underflow of data in the buffers for the respective elementary streams in the system target decoder STD, and that the access units are packetized. Incidentally, the overflow means that the data supplied to the decoder exceeds a capacity of the buffer, while the underflow means that the access unit to be decoded is not completely supplied to the buffer at the decode time thereof.

In the foregoing, the MPEG2 program stream shown in FIG. 2A is explained. Incidentally, the MPEG2 transport stream as shown in FIG. 2B has the same structure as that of the MPEG2 program stream. A transport stream header as shown in FIG. 2B is constituted by four bytes from synchronous byte (syc_byte) to continuity counter, which is prescribed in the afore-mentioned ISO/IEC13818-1. The clock reference and the decode time has the same meanings as those of the MPEG2 program stream shown in FIG. 2A.

The MPEG video data have a structural unit called Group of Pictures (GOP). The structural unit can be encoded independently, i.e., the encoding of the GOP can be done such that when the GPO is decoded, any picture involved in the preceding GOP is not required. Accordingly, if a plurality of video streams are present, they can be switched by GOP or GOPs as a unit for the switching.

In the following, there is considered the case where two different kinds of program streams, which have been encoded under the afore-mentioned conditions, i.e., under such conditions that the video stream is encoded every GOP, are independently multiplexed. At this time, however, there is such a limitation that the boundary of each GOP is not present within the video packet, namely video data of pictures immediately before and after the boundary of GOP does not exist within one video packet.

Figure 3A:
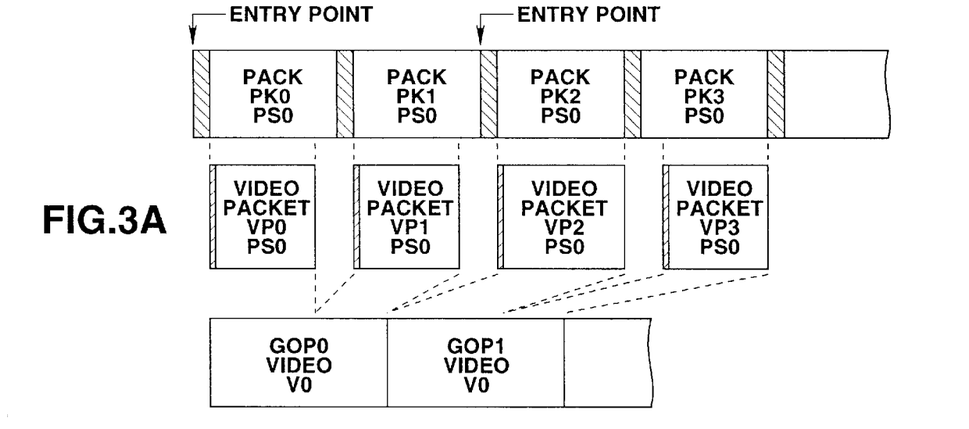
FIGS. 3A through 3C are views showing examples of streams obtained by independently multiplexing different two program streams, and a stream obtained by switching these two program streams from one to another, respectively.
Figure 3B:
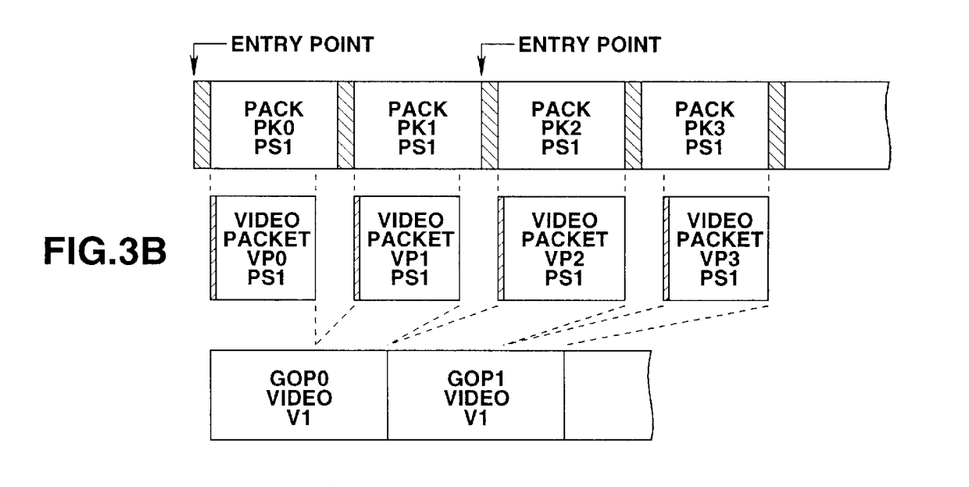
Figure 3C:
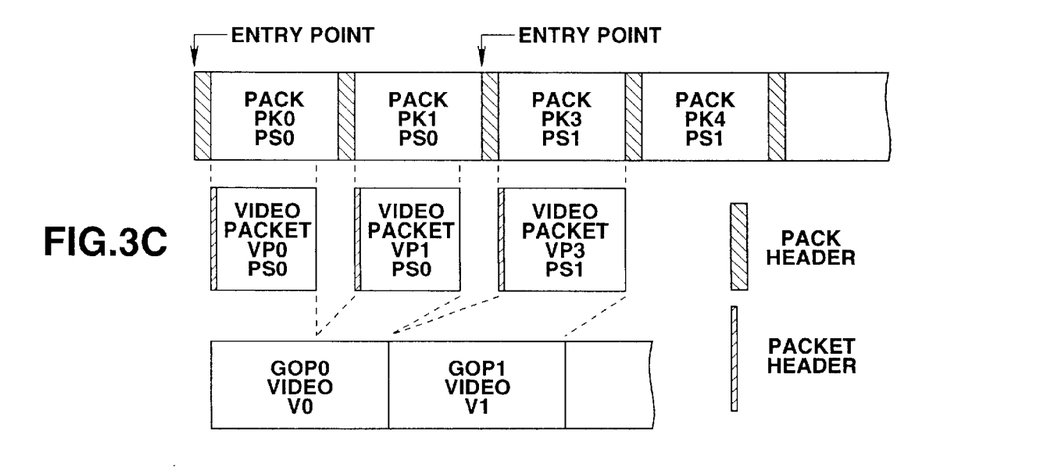

FIGS. 3A through 3C illustrate an example of the case where two program streams are independently multiplexed under the afore-mentioned conditions, and an example of the case where the two program streams are selectively switched from one to another and outputted. As shown in FIG. 3A, the data of GOP0 in video stream V0 are multiplexed over packs PK0 and PK1 of a program stream PS0, and the data of GOP1 of the video stream V0 are multiplexed over packs PK2 and PK3 of the program stream PS0. On the other hand, as shown in FIG. 3B, the data of GOP0 in video stream V1 are multiplexed over packs PK0 and PK1 and PK2 of program stream PS1, and the data of GOP1 of the video stream V1 are multiplexed over a pack PK3 of the program stream PS1.

The two program streams independently multiplexed as shown in FIGS. 3A and 3B, are stored on a common recording medium. If such a system that the thus-stored two program streams are outputted every pack or packs while selectively switching therebetween, for example, by using the read-out device 10 shown in FIG. 1, is now considered, the afore-mentioned independent GOP (Group of Pictures) arrangement enables the video data to be continuously reproduced in a seamless manner when the program streams outputted are switched at switching points.

For example, as shown in FIG. 3C, when the packs PK0 and PK1 of the program stream PS0 are read out and thereafter the pack 3 of the program stream PS1 is continuously read out, the GOP0 of the video stream V0 and then the GOP1 of the video stream V1 are inputted into the video buffer 12 shown in FIG. 1, so that the video image can be continuously reproduced even if it is switched between the video streams V0 and V1. In this example, although there is described the case where the two different program streams are stored in the recording medium, it will be appreciated that the same effects can be obtained when three or more program streams are used. Hereinafter, packs corresponding to these switching points between the GOPs are referred to as entry points.

Meanwhile, in the case where a plurality of program streams are stored in a recording medium and a read-out device has a function for reading out the program streams while being switched from one to another at entry points, there occasionally arises an inconvenience that these program streams cannot be correctly decoded by a decoder if such plural program streams to be stored on the recording medium are independently multiplexed as in conventional methods. This is caused by the following two reasons.

Reason I: Inconsistency of system clock reference (SCR):

The system clock reference (SCR) encoded in the pack header represents a read-out start time of the pack data inputted to the decoder. For this reason, the system clock references (SCR) of the adjacent two packs to be read-out and input to the decoder are needed to satisfy the following condition:

(SCR encoded in the latter pack)≧[(SCR encoded in the former pack)+(transfer time of the former pack)], namely, (SCR encoded in the latter pack),≧[(SCR encoded in the former pack)+(data length of the former pack)/(read-out rate)]

Accordingly, even though the afore-mentioned condition can be satisfied when the program stream PS0 is read-out in the order of PK0, PK1, PK2, PK3 . . . (namely, even though the individual program streams are multiplexed so as to satisfy the afore-mentioned condition), if the program streams are switched from one to another by the data encoded in the entry points, for example, such that the packs PK0 and PK1 of the program stream PS0 are first read out and then the pack PK3 of the program stream PS1 is read out, as shown in FIG. 3C, there occasionally arises such a problem that the afore-mentioned condition is no longer satisfied because the program streams PS0 and PS1 are multiplexed separately from each other. That is, when the program streams are read-out in the afore-mentoioned order, the system time clock (STC) upon the termination of reading-out of the former pack becomes larger than the value of the system clock reference encoded in the latter pack, so that it is impossible to read out the data of the latter pack.

Reason II: Inappropriate operative condition of buffer (Overflow and/or underflow of data in buffer):

When the program streams to be read-out are switched from one to another by the read-out device, the inappropriate operative condition of the decoder buffer such as overflow or under flow is likely to occur.

Figure 4A:
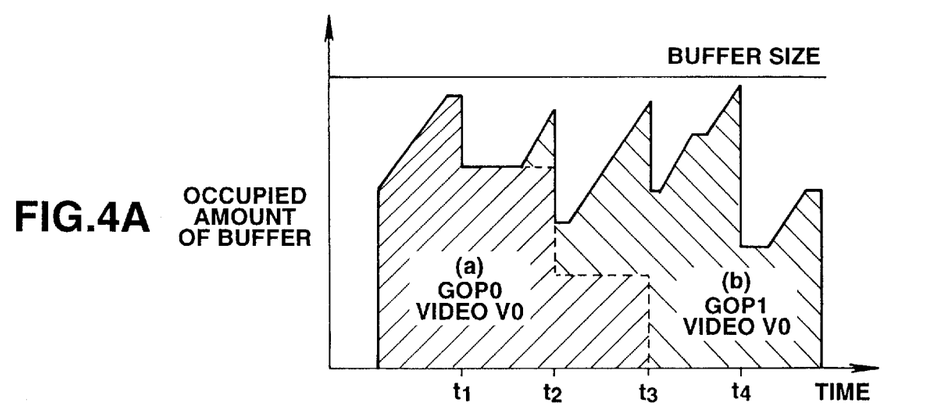
FIGS. 4A through 4C are graphs explaining the attitude of buffer observed when program streams are switched from one to another.
Figure 4B:
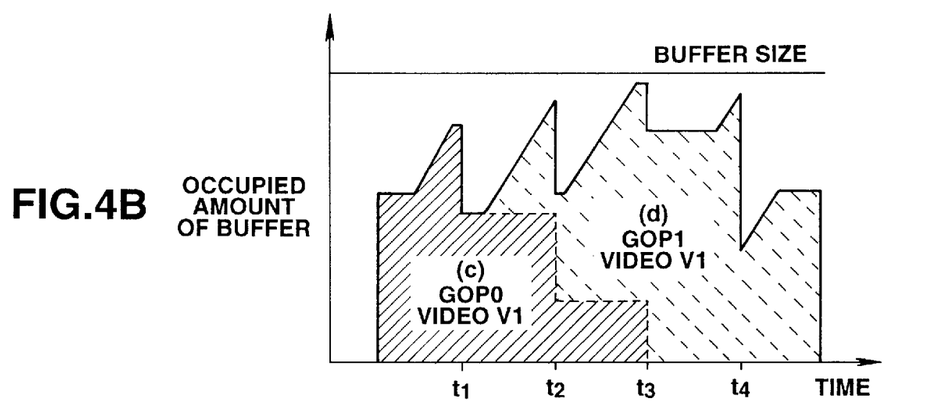
Figure 4C:
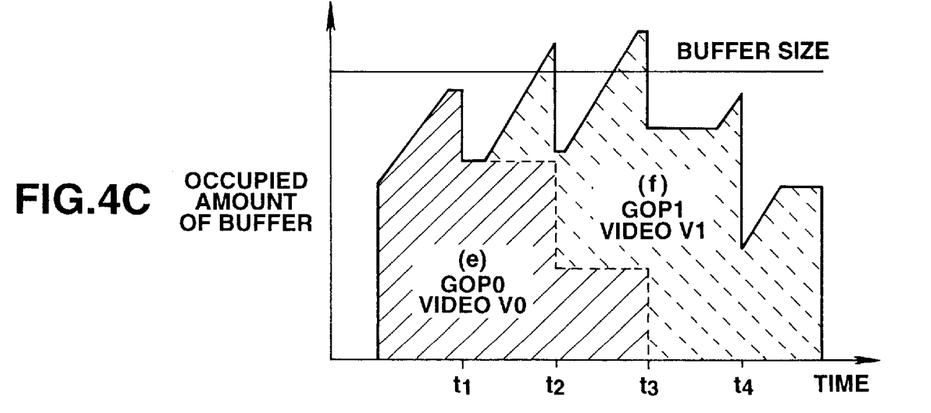

The afore-mentioned Reason II is explained in detail below by referring to FIGS. 4A through 4C. FIGS. 4A through 4C illustrate the transition in memory amount of the video decoder buffer occupied by the data. FIG. 4A shows the condition of the decoder buffer, where, for example as shown in FIG. 3A, the program stream PS0 is regularly read omit in the order of the packs PK0, PK1, PK2, PK3 and so on. In FIG. 4A, the region (a) represents the amount of data in the buffer which is occupied by the GOP0 of the video stream V0 and the region (b) represents the amount of data in the buffer which is occupied by the GOP1 of the video stream V0. FIG. 4B shows the condition of the decoder buffer, where, for example as shown in FIG. 3B, the program stream PS1 is regularly read out in the order of the packs PK0, PK1, PK2, PK3 and so on. In FIG. 4B, the region (c) represents the amount of data in the buffer which is occupied by the GOP0 of the video stream V1 and the region (d) represents the amount of data in the buffer which is occupied by the GOP1 of the video stream V1. Each of the program streams shown in FIGS. 4A and 4B is continuously formed. Therefore, the program streams are multiplexed such that the decoder buffer does not cause inappropriate operative condition thereof such as overflow or underflow. However, if the multiplexed program streams are read out while being switched from one to another by the read-out device such that the packs PK0 and PK1 of the program stream PS0 are first read out in this order and then the pack PK3 of the program stream PS1 is read out, as shown in FIG. 3C, the decoder buffer is supplied first with the data of the GOP0 of the video stream V0 and then with the data of the GOP1 of the video stream V1. As a result, the amount of data occupied by these GOP's in the decoder buffer is in the condition as shown in FIG. 4C. In FIG. 4C, the region (e) represents the amount of data occupied by the GOP0 of the video stream V0 and the region (f) represents the amount of data occupied by the GOP1 of the video stream V1.

When the data of the GOP1 of the video stream V1 is decoded, the read-out thereof is determined by the system clock reference (SCR) while the pulling-out of the data from the decoder buffer is determined by the decoding time stamp (DTS), so that timings of reading-out and pulling-out of the data from the decoder buffer are similar to (f) shown in FIG. 4C, thereby causing the over flow of the decoder buffer.

The present invention has been accomplished in view of the afore-mentioned problems encountered in the art.

SUMMARY OF THE INVENTION

Accordingly, it is an object of the present invention to provide a method and an apparatus for encoding a digital signal, a recording medium for storing the digital signal and a method and an apparatus for transmitting the digital signal, which are prevented from causing misalignment of system clock references when a plurality of program streams are read out while being switched from one to another at entry points thereof, and are capable of reading out the program streams without an inappropriate operative condition of a decoder buffer such as overflow or underflow of data in the buffer.

In a first aspect of the present invention, there is provided a method for encoding a digital signal, which method includes the steps of receiving a plurality of digital signal bit streams, detecting sizes of access units, as an encoding unit, of the plural digital signal bit streams, and decode times thereof, comparing the detected sizes of the access units at each decode time, with each other to select a maximum value thereof, providing a virtual stream composed of access units each having a size identical to the selected maximum value at each decode time, and packetizing each of the plural digital signal bit streams, wherein the plural digital signal bit streams are packetized by using padding packets each having a size corresponding to a difference in size between each access unit of the plural digital signal bit streams and that of the virtual stream, when the size of the access unit of the plural digital signal bit streams is less than the size of the access unit of the virtual stream.

In a second aspect of the present invention, there is provided an apparatus for encoding a digital signal, which includes a receiving terminal for receiving a plurality of digital signal bit streams, an access unit detecting device for detecting sizes of access units, as an encoding unit, of the plural digital signal bit streams, and decode times thereof, a maximum value detecting device for comparing the detected sizes of the access units at each decode time, with each other to select a maximum value thereof, a scheduler for providing a virtual stream composed of access units each having a size identical to the selected maximum value at each decode time; and a packetizing device for packetizing each of the plural digital signal bit streams, wherein the plural digital signal bit streams are packetized by using padding packets each having a size corresponding to a difference in size between each access unit of the plural digital signal bit streams and that of the virtual stream, when the size of the access unit of the plural digital signal bit streams is less than the size of the access unit of said virtual stream.

In a third aspect of the present invention, there is provided a method for transmitting a digital signal, which method includes the steps of receiving a plurality of digital signal bit streams, detecting sizes of access units, as an encoding unit, of the plural digital signal bit streams, and decode times thereof, comparing the detected sizes of the access units at each decode time, with each other to select a maximum value thereof, providing a virtual stream composed of access units each having a size identical to the selected maximum value at each decode time, and packetizing each of the plural digital signal bit streams, wherein the plural digital signal bit streams are packetized by using padding packets each having a size corresponding to a difference in size between each access unit of the plural digital signal bit streams and that of the virtual stream, when the size of the access unit of the plural digital signal bit streams is less than the size of the access unit of said virtual stream, thereby transmitting one stream produced by packetizing the plural digital signal bit streams.

In a fourth aspect of the present invention, there is provided a method for storing a recording signal on a recording medium, which includes the steps of receiving a plurality of digital signal bit streams, detecting sizes of access units, as an encoding unit, of the plural digital signal bit streams, and decode times thereof, comparing the detected sizes of the access units at each decode time, with each other to select a maximum value thereof, providing a virtual stream composed of access units each having a size identical to the selected maximum value at each decode time, and packetizing each of the plural digital signal bit streams, wherein the plural digital signal bit streams are packetized by using padding packets each having a size corresponding to a difference in size between each access unit of the plural digital signal bit streams and that of said virtual stream, when the size of the access unit of the plural digital signal bit streams is less than the size of the access unit of said virtual stream.

DETAILED DESCRIPTION OF THE PREFERRED EMBODIMENT

The preferred embodiments of the present invention are described below by referring to the accompanying drawings.

Figure 5:
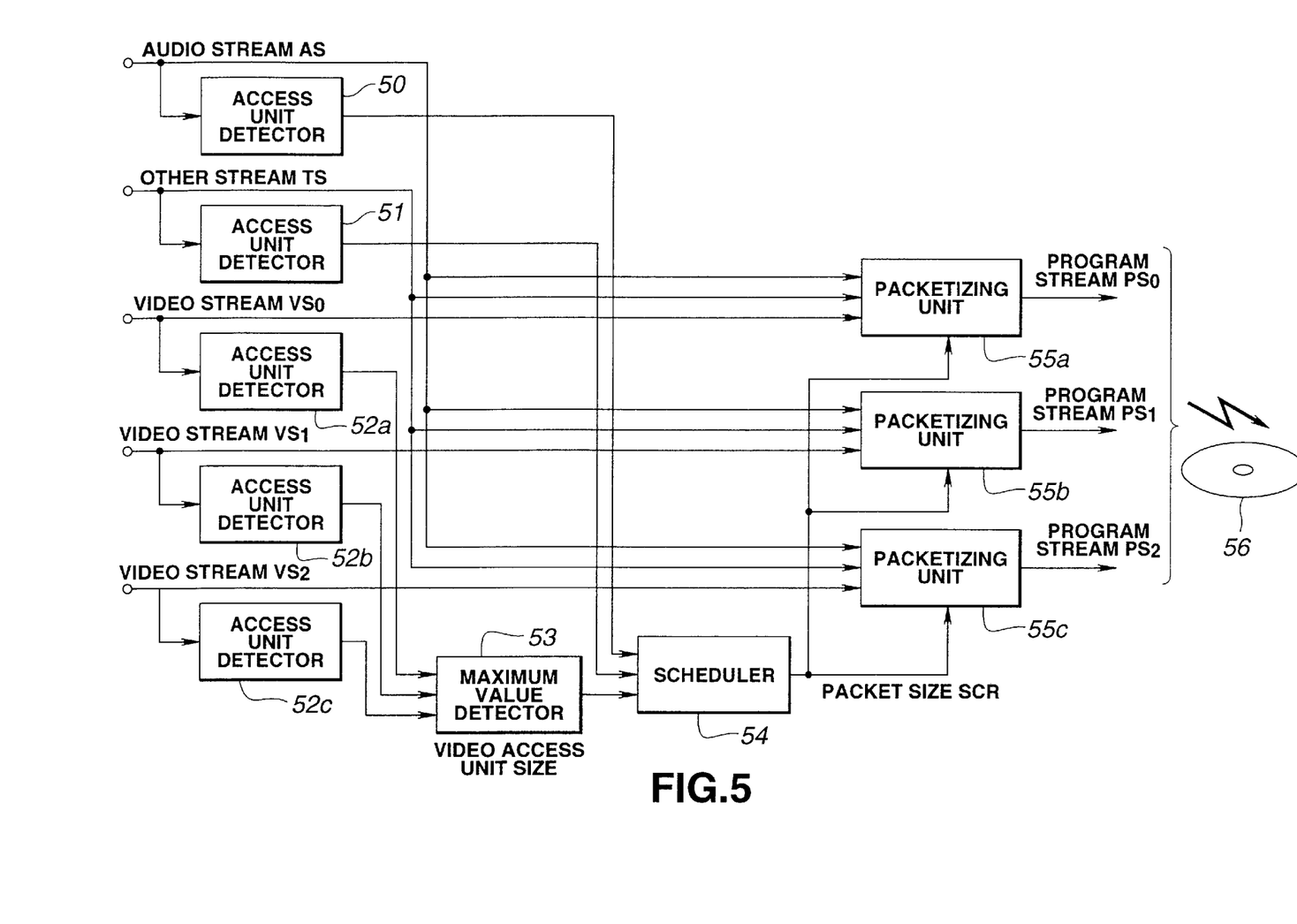
FIG. 5 is a block diagram schematically showing an arrangement of a digital signal encoding apparatus according to a preferred embodiment of the present invention.

FIG. 5 illustrates a block diagram schematically showing a digital signal encoding device according to a preferred embodiment of the present invention. In this embodiment, it is assumed that a plurality of videos provided from the same scene but at different camera angles, for example, three different video streams $VS_0$ to $VS_2$, are encoded.

Since these video streams are provided from the same scene, the other data to be multiplexed over the respective three video streams $VS_0$ to $VS_2$, which include, for example, audio data or superimposed data (audio stream AS or additional stream such TS), may be identical to each other. For this reason, one kind of stream for each of the other data can be used to be multiplexed relative to each of the three video streams $VS_0$ to $VS_2$. When the finally-produced program streams $PS_0$ to $PS_2$ are reproduced on a decoder side while being switched from one to another every GOP (Group of Pictures) or GOP's, in order to assure a continuous reproduction at each switching point, it is required that the time and the field parity at the switching point (i.e., whether it starts from a top field or a bottom field) between the respective video streams are identical to each other. To fulfill the afore-mentioned requirement, picture types, top field first flag and repeat first field flag of the videos provided at different camera angles can be coded identically. Actually, these are not necessarily coded similarly.

Incidentally, the top field first flag and the repeat first field flag are defined as follows in MPEG2. The top field first flag means a flag which indicates which field should be first output, the top field or the bottom field, when an interlace is displayed on a monitor. On the other hand, the repeat first field flag means a flag which indicates the field excluded when signals produced by 3:2 pull-down method are encoded, for example, in the case where the film source (24 frames) such as movie films is converted into interlace video signals (30 frames).

In this embodiment according to the present invention, the video streams provided at different camera angles can be multiplexed such that the video buffer is maintained in the same condition after the access unit is pulled out of the buffer and then decoded, even though any of the video streams is intended to be decoded. This makes it possible to maintain the same condition of the buffer even when the program streams are switched from one to another every GOP or GOP's. As a result, the video streams can be reproduced in a seamless manner without inappropriate operative condition of the buffer.

In the following, the system used in the embodiment according to the present invention is described.

In FIG. 5, there are shown access unit decoders 50, 51 and 52a to 52c which can detect a size of each elementary stream and a decode time (DTS) of the access unit (if the decode time is different from the presentation time (PTS), the presentation time is also detected). In the case where the encoder for elementary stream and the multiplexer are formed as an integral system, it is highly possible to output the aforementioned information from the encoder. In such a case, output values of the encoder can be used for the detection.

In FIG. 5, an audio stream AS is supplied to the access unit detector 50; three video streams $VS_0$, $VS_1$ and $VS_2$ provided at different camera angles are supplied to the access unit detectors 52a, 52b and 52c, respectively; and other stream TS is supplied to the access unit detector 51. The respective access unit detectors 50, 51 and 52a to 52c can detect the size of access unit of each elementary stream and the decode time DTS and, if necessary, the presentation time PTS.

The access unit detectors 52a, 52b and 52c supply the data indicating the size of each access unit of the three video streams $VS_0$, $VS_1$ and $VS_2$ to a maximum value detector 53 where the sizes of the access units are compared with each other to select the maximum size of the access units every decode time.

Figure 6:
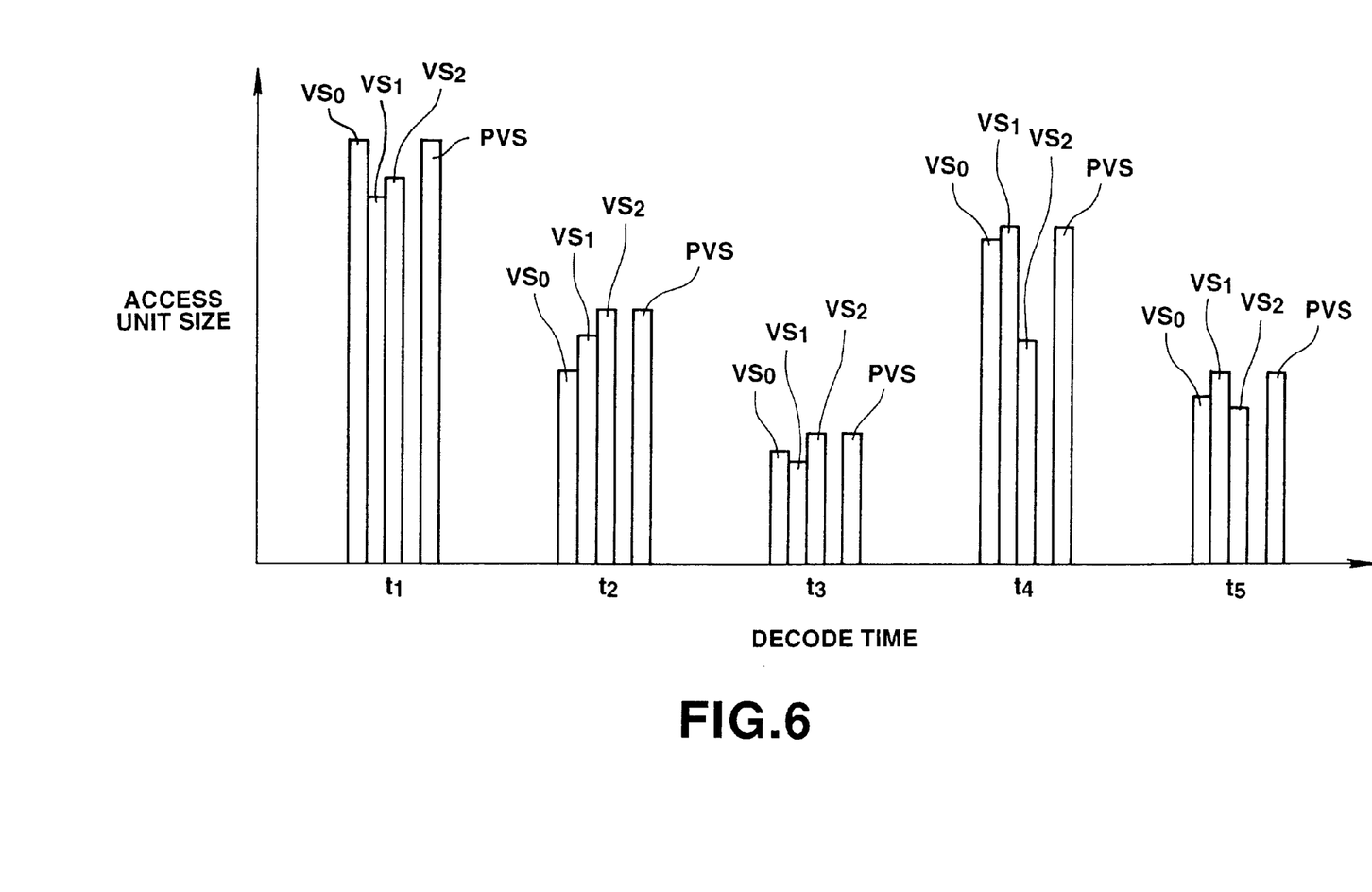
FIG. 6 is a graph explaining a manner for determining access units of a virtual video.

FIG. 6 illustrates the manner for determining the maximum size of the access units of the three video streams $VS_0$, $VS_1$ and $VS_2$. For better understanding, in FIG. 6, grouped access units of the respective video streams $VS_0$, $VS_1$ and $VS_2$ at each decode time are shown as being displaced along the direction of abscissa (time axis). However, as will be apparently appreciated, each group shows the sizes of the access units which are present at the same time, i.e., at each decode time $t_n$ (n=1, 2, . . . ). At each decode time $t_n$, a virtual video stream PVS whose access unit has a size identical to the maximum size of the access units of the video streams $VS_0$, $VS_1$ and $VS_2$ is selected. It is considered that the virtual video stream PVS has such decode intervals and the size of access unit.

A scheduler 54 receives, from the access unit detectors 50 and 51, the data information concerning a size of access unit and decode time for the other elementary streams to be multiplexed over the virtual video stream PVS which include audio stream AS and the other stream TS such as superimposition data, and outputs a control information such as kind of elementary stream to be packetized, a size of the packet, a system clock reference (SCR) added to the packet or the like. The scheduler 54 may be the same as those used for ordinary multiplexing systems. For instance, there can be used the scheduling technique disclosed in the specification and drawings of Japanese Patent Application Laid-open No. Hei-7-341951 filed by the assignee of the present application. Meanwhile, the U.S. equivalent of the Japanese Patent Application has now been present as a co-pending application. Further, other scheduling techniques may be used in the present invention.

The control information output from the scheduler 54 is supplied to packetizing units 55a, 55b and 55c to packetize the elementary streams. In this case, since the scheduler 54 schedules the virtual video stream (virtual video) PVS, even if the control information produced from the scheduler is used to packetize actual video streams (actual video), the occupied amount of the buffer upon withdrawal of the access unit therefrom is not necessarily the same. However, the following relationship is established:

[Size of access unit of actual video]≦[Size of access unit of virtual video]

Accordingly, in the case where the size of access unit of the actual video is less than the size of access unit of the virtual video upon packetizing, when a padding packet is packetized, the condition of the buffer after the withdrawal (decoded) of the data therefrom can be kept constant irrespective of the difference in camera angle between the video streams.

The operation of these packetizing units 55a through 55c is explained by referring to FIGS. 7A to 7E.

Figure 7A:
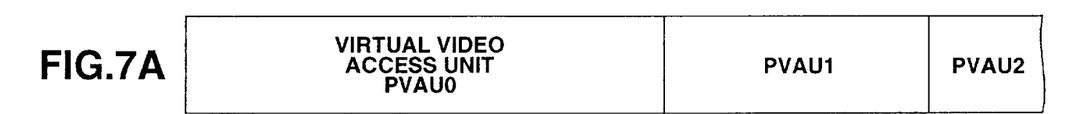
FIGS. 7A through 7E are views showing an example of a program stream produced according to the preferred embodiment of the present invention.
Figure 7B:
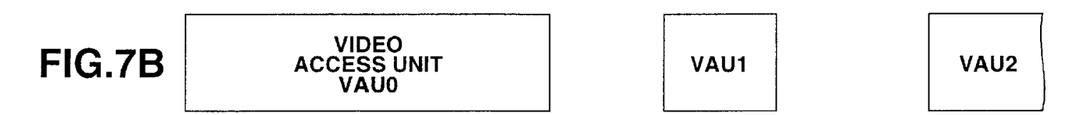
Figures 7C, 7D:
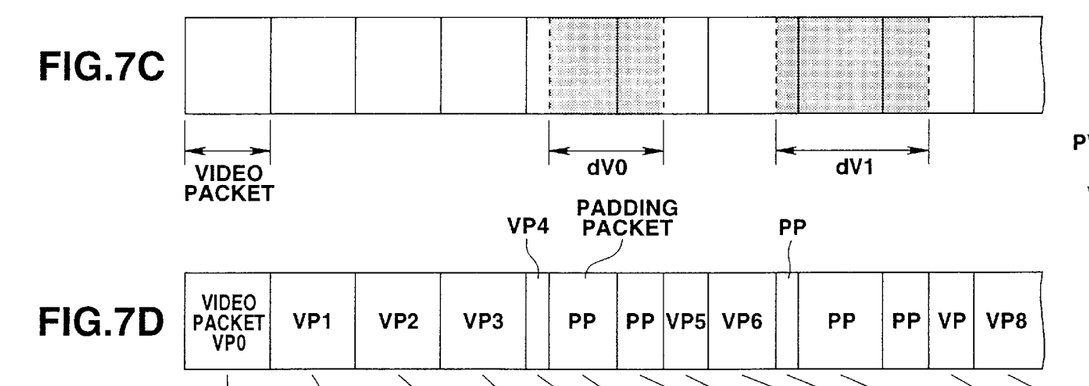
Figure 7E:
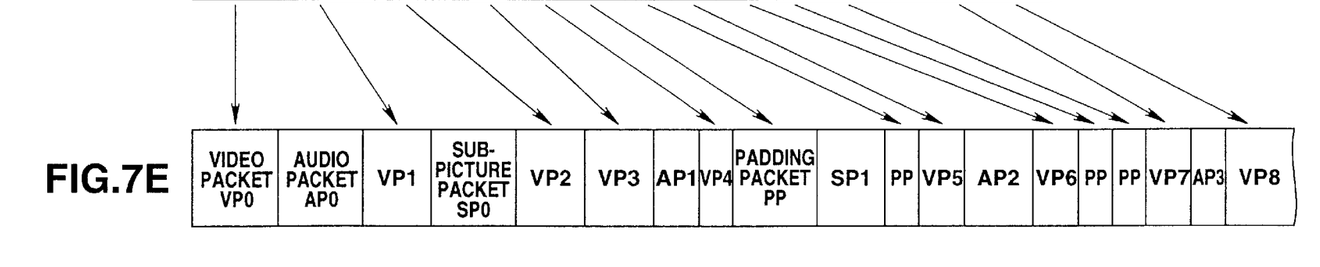

FIG. 7A illustrates a size of an access unit PVAU of the virtual video and FIG. 7B illustrates a size of an access unit VAU of the video to be actually multiplexed. In FIG. 7C, the solid lines in the virtual video show packets divided by the multiplexing scheduler. When the actual video is packetized into respective video packets VP by using the information output from the scheduler, the portions as indicated with hatching in FIG. 7C are required to be compensated, because the size of the access unit PVAU of the virtual video stream is different to a large extent from that of the access unit VAU of the actual video stream. The packetizing units 55a to 55c have a function to generate padding packets PP shown in FIG. 7D at the times corresponding to the hatching portions shown in FIG. 7C. When the video stream is packetized as shown in FIG. 7D, the program stream as shown in FIG. 7E, over which the other elementary streams are multiplexed, can be produced. In this embodiment, one stream of the video data, one stream of the audio data and one stream of the superimposition data are multiplexed.

In addition, in the case where the difference in size of access unit between the virtual and actual video streams is compensated as mentioned above and the padding packet PP itself constitutes a pack, even if the padding packet PP is not transmitted, the transition of the respective elementary streams in the buffer is not influenced at all thereby. In order to reduce the occurrence of overhead upon multiplexing, i.e., in order to prevent undesired accumulation of the data, the packetizing units 55a to 55c have a function for withholding the padding packets PP from being packetized.

That is, in this embodiment, since the padding packet PP itself indicated by "x" in FIG. 7D, constitutes a pack, the padding packet PP is not packetized in the program stream shown in FIG. 7E. However, when it is intended to simplify the hardware of the packetizing units 55, all the padding packets PP can be packetized, though the overhead associated with the multiplexing is increased.

Figure 8:
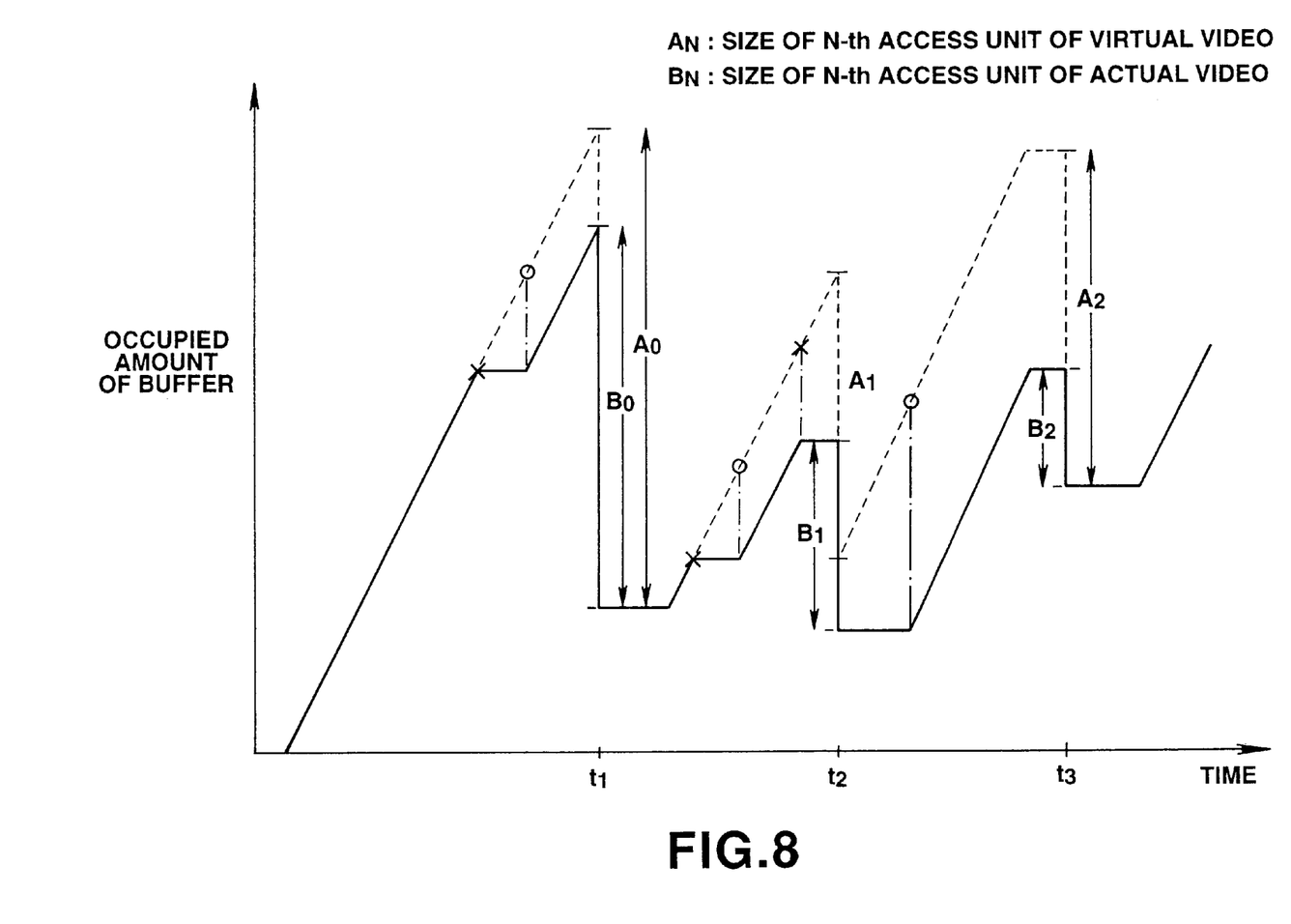
FIG. 8 is a view explaining an attitude of the buffer observed when the program stream produced according to the preferred embodiment of the present invention is decoded.

When the data are multiplexed by the multiplexer according to the present embodiment, the occupied amount of the buffer is varied, for example, as shown in FIG. 8. In FIG. 8, the dotted lines indicate the transition of the occupied amount of the video buffer, which is observed when the virtual video is subjected to scheduling, while the solid lines indicate the occupied amount of the video buffer, which is observed when the actual video is multiplexed by using the information obtained by subjecting the virtual video stream to scheduling. Incidentally, the times t1, t2, t3, . . . represent decode times.

Until the point indicated by the mark "X" in FIG. 8 is reached, the video buffer is loaded at the same timing as that of the virtual video. Further, in the region between the marks "x" and "○", the difference in size of access unit between the virtual and actual videos (actual video stream) is replaced with the padding packet. In this case, no load is applied to the video buffer so that the data amount in the video buffer is not changed until the loading initiation point of the next access unit indicated by the mark "○" or the next decode time $t_n$ (n=1, 2, . . . ) is reached.

As a result, the following relationship can be established at every decode time:
[Occupied amount of buffer by actual video]≦[Occupied amount of buffer by virtual video]

Accordingly, when the video data provided at different camera angles are encoded and multiplexed by the method according to the present invention to produce a plurality of program streams, all the thus-produced program streams can satisfy the afore-mentioned relationship at every decode time. Therefore, if the virtual video is multiplexed so as not to cause any inappropriate operative condition of the decoder buffer, these program streams can also be decoded while being switched from one to another at entry points thereof without causing any inappropriate operative condition of the video buffer.

These program streams $PS_0$, $PS_1$ and $PS_2$ can be stored in a recording medium 56 such as disk.

Figure 9A:
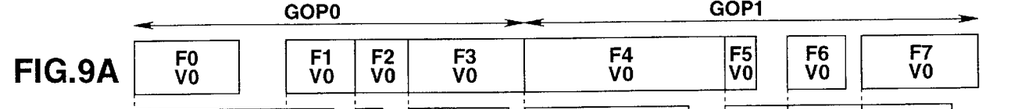
FIGS. 9A through 9I are views showing a program stream obtained when the preferred embodiment of the present invention is applied to video data provided at different two camera angles.
Figure 9B:
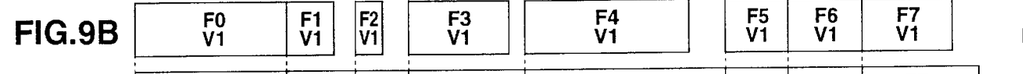
Figure 9C:
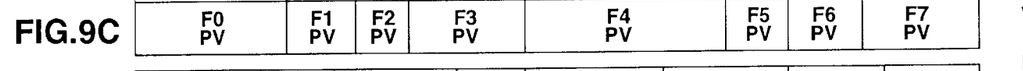
Figure 9D:
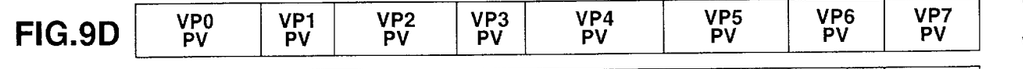
Figure 9E:
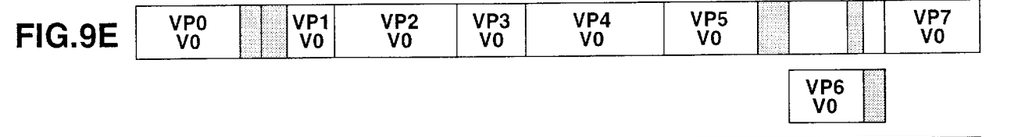
Figure 9F:
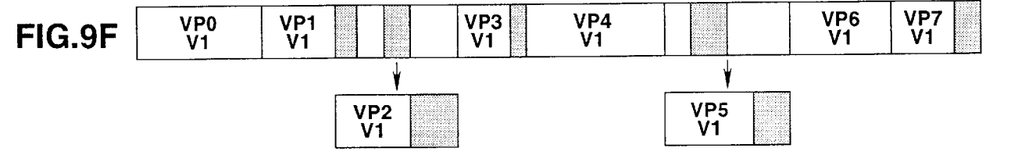
Figure 9G:
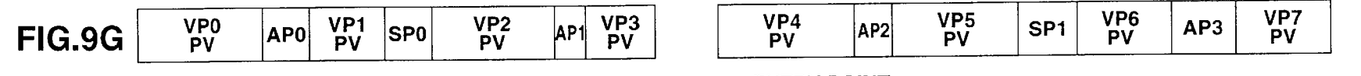
Figure 9H:
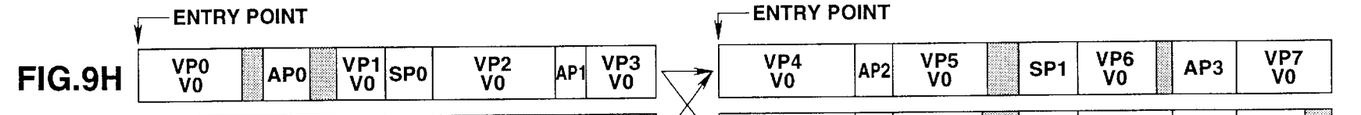
Figure 9I:
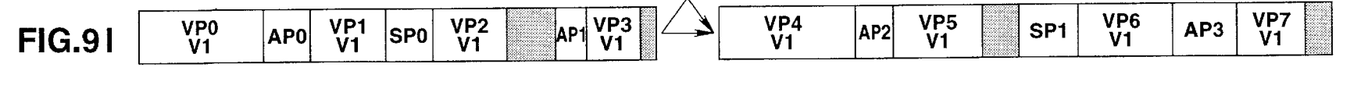

Next, FIGS. 9A through 9I show the case where video data provided at different two camera angles and encoded are multiplexed. FIG. 9A illustrates a size of each access unit of the video V0 and FIG. 9B illustrates a size of each access unit of the video V1. In this embodiment, GOP0 and GOP1 each are constituted by four access units. The "GOP" means "Group of Pictures" prescribed in MPEG. FIG. 9C illustrates a size of each access unit of the virtual video obtained by comparing sizes of access units of the videos V1 and V2 and selecting the larger one. FIG. 9D illustrates the packetized condition of the virtual video resulting from scheduling of the virtual video. When the actual video is multiplexed, if any difference between the virtual and actual videos is caused, padding is performed as shown in FIGS. 9E and 9F. In this case, if a packet of the virtual video is packetized into three or more packets, padding packets thereof may be placed together on a rear side to merge the three or more packets into two packets. Assuming that the virtual video is multiplexed resulting from scheduling to produce a program stream as shown in FIG. 9G, the actual video is multiplexed according to the present embodiment to produce a program stream as shown in FIGS. 9H and 9I.

Video image and sound can be reproduced in a seamless manner without inappropriate operative condition of the buffer even in the case where the thus-produced program streams are decoded while being optionally switched from one to another as indicated by arrows in FIGS. 9H and 9I. Incidentally, in this embodiment, there is considered the case where two videos are multiplexed. However, as will be apparently appreciated, the present invention can be applied to the case where three or more videos are multiplexed.

In the afore-mentioned embodiments, the method according to the present invention is applied to program stream. However, the method according to the present invention can also be applied to transport stream used for the purpose of transmission. In the case of the transport stream, one stream is constituted by a plurality of channels and each channel corresponds to an independent stream. Further, each channel has independently a time base. Accordingly, by applying the afore-mentioned method used for a plurality of program streams to the respective channels, the plural channels serving as streams can be multiplexed over one transport stream to transmit the thus-multiplexed transport stream, so that it is possible to reproduce video images provided at different camera angles in a seamless manner when switching the plural channels from one to another. Further, in the afore-mentioned embodiments, there is considered the case where video images supplied from different camera angles are multiplexed. However, as will be apparently understood, the present invention can be applied to the images which have no relation to each other. Further, the present invention can also be applied to audio data or other data as well as the videos.

In accordance with the present invention, sizes of access units as an encoding unit of a plurality of bit streams composed of digital signals, and decode times are detected, and the thus-detected sizes of the access units are compared with each other at each decode time to select the maximum values thereof. Next, a virtual stream is constructed so as to have access units whose sizes are each equal to the above-selected maximum value at each decode time. In the case where the respective bit streams of the digital signals are packetized, if the size of each access unit is less than that of the afore-mentioned virtual stream, the bit streams are packetized by using padding packets each having a size identical to a difference in size between the access units. Accordingly, the plural bit streams can be reproduced in a continuous manner without any inappropriate operative condition of the decoder buffer even when they are decoded while being switched from one to another.

That is, in accordance with the present invention, when the multiplexing of data is performed for a system having a function capable of reproducing a plurality of multiplexed streams while being switched from one to another, sizes of access units of each stream and decode times are determined from each elementary unit to select the maximum value of the access units at every decode time to establish a virtual video stream which serves for scheduling of the multiplexing. In the case where the actual video is multiplexed, the difference between the virtual and actual videos are compensated by padding, so that the plural multiplexed streams are reproduced while being switched from one to another without any inappropriate operative condition of the buffer and without interruption of video image and sound reproduced. These plural multiplexed streams may be stored in respective portions of a recording medium. Alternatively, the plural multiplexed streams can be merged into one transport stream for the purpose of broadcasting.

As will be apparently appreciated, various changes or modifications can be made without departing from the sprits and scope of the present invention. Accordingly, the present invention is not intended to be limited to only the aforementioned embodiments.

What is claimed is:

1. A method for encoding a digital signal, comprising the steps of:

receiving a plurality of digital signal bit streams;

detecting sizes of access units, as an encoding unit, of said plurality of digital signal bit streams, and decode times thereof;

comparing the detected sizes of the access units at each decode time, with each other to select a maximum value thereof;

providing a virtual stream composed of access units each having a size identical to the selected maximum value at each decode time; and packetizing each of said plurality of digital signal bit streams, said plurality of digital signal bit streams being packetized by using padding packets each having a size corresponding to a difference in size between each access unit of said plurality of digital signal bit streams and that of said virtual stream, when the size of the access unit of said plurality of digital signal bit streams is less than the size of the access unit of said virtual stream.

2. A method according to claim 1 wherein said plurality of digital signal video streams are video streams, further comprising the steps of:

receiving at least an audio stream; and determining a supply time at which said virtual stream as a virtual video stream and said at least an audio stream are supplied to a decoder, and a size of each packet produced, said video streams and said at least an audio stream being packetized by using information concerning said supply time and said size of each packet produced.

3. An apparatus for encoding a digital signal, comprising:

a receiving terminal for receiving a plurality of digital signal bit streams;

an access unit detecting device for detecting sizes of access units, as an encoding unit, of said plurality of digital signal bit streams, and decode times thereof;

a maximum value detecting device for comparing the detected sizes of the access units at each decode time, with each other to select a maximum value thereof;

a scheduler for providing a virtual stream composed of access units each having a size identical to the selected maximum value at each decode time; and a packetizing device for packetizing each of said plurality of digital signal bit streams, said plurality of digital signal bit streams being packetized by using padding packets each having a size corresponding to a difference in size between each access unit of said plurality of digital signal bit streams and that of said virtual stream, when the size of the access unit of said plurality of digital signal bit streams is less than the size of the access unit of said virtual stream.

4. An apparatus according to claim 3 wherein said plurality of digital signal video streams are video streams, further comprising a receiving terminal for receiving at least an audio stream, said scheduler determining a supply time at which said virtual stream as a virtual video stream and said at least an audio stream are supplied to a decoder, and a size of each packet produced, and said video streams and said at least an audio stream being packetized by using information concerning said supply time and said size of each packet produced.

5. A method for transmitting a digital signal, comprising the steps of:

receiving a plurality of digital signal bit streams;

detecting sizes of access units, as an encoding unit, of said plurality of digital signal bit streams, and decode times thereof;

comparing the detected sizes of the access units at each decode time, with each other to select a maximum value thereof;

providing a virtual stream composed of access units each having a size identical to the selected maximum value at each decode time; and packetizing each of said plurality of digital signal bit streams, said plurality of digital signal bit streams being packetized by using padding packets each having a size corresponding to a difference in size between each access unit of said plurality of digital signal bit streams and that of said virtual stream, when the size of the access unit of said plurality of digital signal bit streams is less than the size of the access unit of said virtual stream, thereby transmitting one stream produced by packetizing said plurality of digital signal bit streams.

6. A method according to claim 5 wherein said plurality of digital signal video streams are video streams, further comprising the steps of:

receiving at least an audio stream; and determining a supply time at which said virtual stream as a virtual video stream and said at least an audio stream are supplied to a decoder, and a size of each packet produced, said video streams and said at least an audio stream being packetized by using information concerning said supply time and said size of each packet produced.

7. A recording medium on which a recording signal is stored, said recording medium being produced by a method comprising the steps of:

receiving a plurality of digital signal bit streams;

detecting sizes of access units, as an encoding unit, of said plurality of digital signal bit streams, and decode times thereof;

comparing the detected sizes of the access units at each decode time, with each other to select a maximum value thereof;

providing a virtual stream composed of access units each having a size identical to the selected maximum value at each decode time; and packetizing each of said plurality of digital signal bit streams, said plurality of digital signal bit streams being packetized by using padding packets each having a size corresponding to a difference in size between each access unit of said plurality of digital signal bit streams and that of said virtual stream, when the size of the access unit of said plurality of digital signal bit streams is less than the size of the access unit of said virtual stream.

8. A recording medium according to claim 7 wherein said plurality of digital signal video streams are video streams, said method for producing the recording medium further comprising the steps of:

receiving at least an audio stream; and determining a supply time at which said virtual stream as a virtual video stream and said at least an audio stream are supplied to a decoder, and a size of each packet produced, said video streams and said at least an audio stream being packetized by using information concerning said supply time and said size of each packet produced.

* * * * *